US010364968B2

(12) United States Patent
Baker et al.

(10) Patent No.: US 10,364,968 B2
(45) Date of Patent: Jul. 30, 2019

(54) EXTERNALLY ACTUATED JOINER ASSEMBLY FOR CONNECTING ADJACENT STRUCTURES

(71) Applicant: Hubbell Incorporated, Shelton, CT (US)

(72) Inventors: Derek Bruce Baker, Middleborough, MA (US); David W. Dranchak, Endwell, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/758,532

(22) PCT Filed: Sep. 7, 2016

(86) PCT No.: PCT/US2016/050489
§ 371 (c)(1),
(2) Date: Mar. 8, 2018

(87) PCT Pub. No.: WO2017/044449
PCT Pub. Date: Mar. 16, 2017

(65) Prior Publication Data
US 2018/0252395 A1    Sep. 6, 2018

Related U.S. Application Data

(60) Provisional application No. 62/216,106, filed on Sep. 9, 2015.

(51) Int. Cl.
*F21V 21/005* (2006.01)
*F16B 2/04* (2006.01)
*F16B 2/14* (2006.01)
*F16B 45/00* (2006.01)
(Continued)

(52) U.S. Cl.
CPC .............. *F21V 21/005* (2013.01); *F16B 2/04* (2013.01); *F16B 2/14* (2013.01); *F16B 45/00* (2013.01); *F21V 17/06* (2013.01); *F21V 17/107* (2013.01)

(58) Field of Classification Search
CPC ...... F21V 21/005; F21V 17/107; F21V 17/06; F16B 2/04; F16B 2/14; F16B 45/00
See application file for complete search history.

(56) References Cited

U.S. PATENT DOCUMENTS 3,700,887 A    10/1972  Marx
4,116,479 A     9/1978  Poe
4,566,819 A     1/1986  Johnston
(Continued)

OTHER PUBLICATIONS

US 5,525,973 A, 07/1996, Bailey et al. (withdrawn)
(Continued)

*Primary Examiner* — Anne M Hines
(74) *Attorney, Agent, or Firm* — Dority & Manning, P.A.

(57) ABSTRACT

Systems and apparatus for joining structures, such as light fixture sections, are provided. In some example embodiments, a joiner assembly can include a hook element having an opening defined in at least one side portion of the hook element and a translational element passing through the opening of the hook element. The joiner assembly further includes an actuator operably connected to the translational element such that rotational movement of the actuator causes the translational element rotate the hook element from a first position to a second position.

20 Claims, 9 Drawing Sheets

(51) Int. Cl.
*F21V 17/06* (2006.01)
*F21V 17/10* (2006.01)

(56) References Cited

U.S. PATENT DOCUMENTS

| | | | |
|---|---|---|---|
| 5,087,088 A * | 2/1992 | Milam | E05B 15/0006 |
| | | | 292/110 |
| 6,264,252 B1 | 7/2001 | Clancy | |
| 6,672,632 B1 | 1/2004 | Speed et al. | |
| 2004/0065796 A1 | 4/2004 | Evans et al. | |

OTHER PUBLICATIONS

PCT International Search Report & Opinion for corresponding PCT Application No. PCT/US2016/050489, dated Nov. 29, 2016—10 pages.
PCT International Preliminary Report on Patentability for corresponding PCT Application No. PCT/US2016/050489, dated Mar. 13, 2018, 8 pages.

* cited by examiner

EXTERNALLY ACTUATED JOINER ASSEMBLY FOR CONNECTING ADJACENT STRUCTURES

PRIORITY CLAIM

The present application is a 371 of International Application No. PCT/US2016/050489 filed Sep. 7, 2016, which claims priority to U.S. Provisional Application No. 62/216,106 filed on Sep. 9, 2015, which is incorporated herein in its entirety by reference thereto.

FIELD

The present disclosure relates to systems and apparatus for joining structures and, more particularly, to systems and apparatus for joining lighting fixtures and other structures.

BACKGROUND

Structures and assemblies such as linear lighting fixtures (a lighting fixture can also often referred to as a luminaire) can be used for the illumination of open spaces. This is due to their ease of installation and their flexibility to be configured to provide many different combinations of direct and indirect light in a wide variety of form factors and optional features.

Linear lighting fixtures can have a long dimension that is greater than a short dimension of the lighting fixture. Linear lighting fixtures can include a plurality of modular sections that can be joined together in, for instance, an end-to-end arrangement, edge-to-edge arrangement, or other arrangement. This can allow a manufacturer to offer a variety of products of varying lengths for a particular model without having to incur the costly tooling expenses needed for each separate model.

Adjacent sections of the modular sections can be joined together, for instance, by a nut-and-bolt method of assembly. In a nut-and-bolt method of assembly, two adjacent sections can be aligned, a bolt can be placed through aligned holes from a first section, and a nut can be placed on the bolt that has passed through a corresponding hole in the second section. Once the nut is placed, the nut can be secured and tightened to secure the two sections together.

This method of assembly can pose challenges. For instance tools can be difficult to fit inside the modular sections. As a result, fixture disassembly can be required to join the modular sections. There are alternative solutions available that use items such as cast plates or interlocking housings, but these alternatives can be complicated to manufacture and/or install.

SUMMARY

Aspects and advantages of embodiments of the present disclosure will be set forth in part in the following description, or may be learned from the description, or may be learned through practice of the embodiments.

One example aspect of the present disclosure is directed to a joiner assembly for joining a first structure and a second structure. The joiner assembly includes a hook element having an opening defined in at least one side portion of the hook element and a translational element passing through the opening of the hook element. The joiner assembly further includes an actuator operably connected to the translational element such that rotational movement of the actuator causes the translational element rotate the hook element from a first position to a second position.

Another example aspect of the present disclosure is directed to a lighting system having a first housing section and a second housing section. The system can further include a joiner assembly having a hook element, a translational element passing through the hook element, and an actuator operably connected to the translational element. The hook element can be inserted through an opening in the first housing section. The actuator can be received into an opening defined in the second housing section such that at least a portion of the actuator remains accessible from an exterior of the first housing section and the second housing section.

Yet another example aspect of the present disclosure is directed to a lighting system. The lighting system includes a first housing section and a second housing section. The system further includes means for joining the first housing section and the second housing section. The means for joining the first housing section and the second housing section can include a joiner assembly according to one or more aspects of any example embodiments of the present disclosure.

Other example aspects of the present disclosure can include apparatus, light fixtures, lighting systems and methods that include or relate to the joiner assemblies for joining structures. Variations and modifications can be made to example aspects of the present disclosure.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
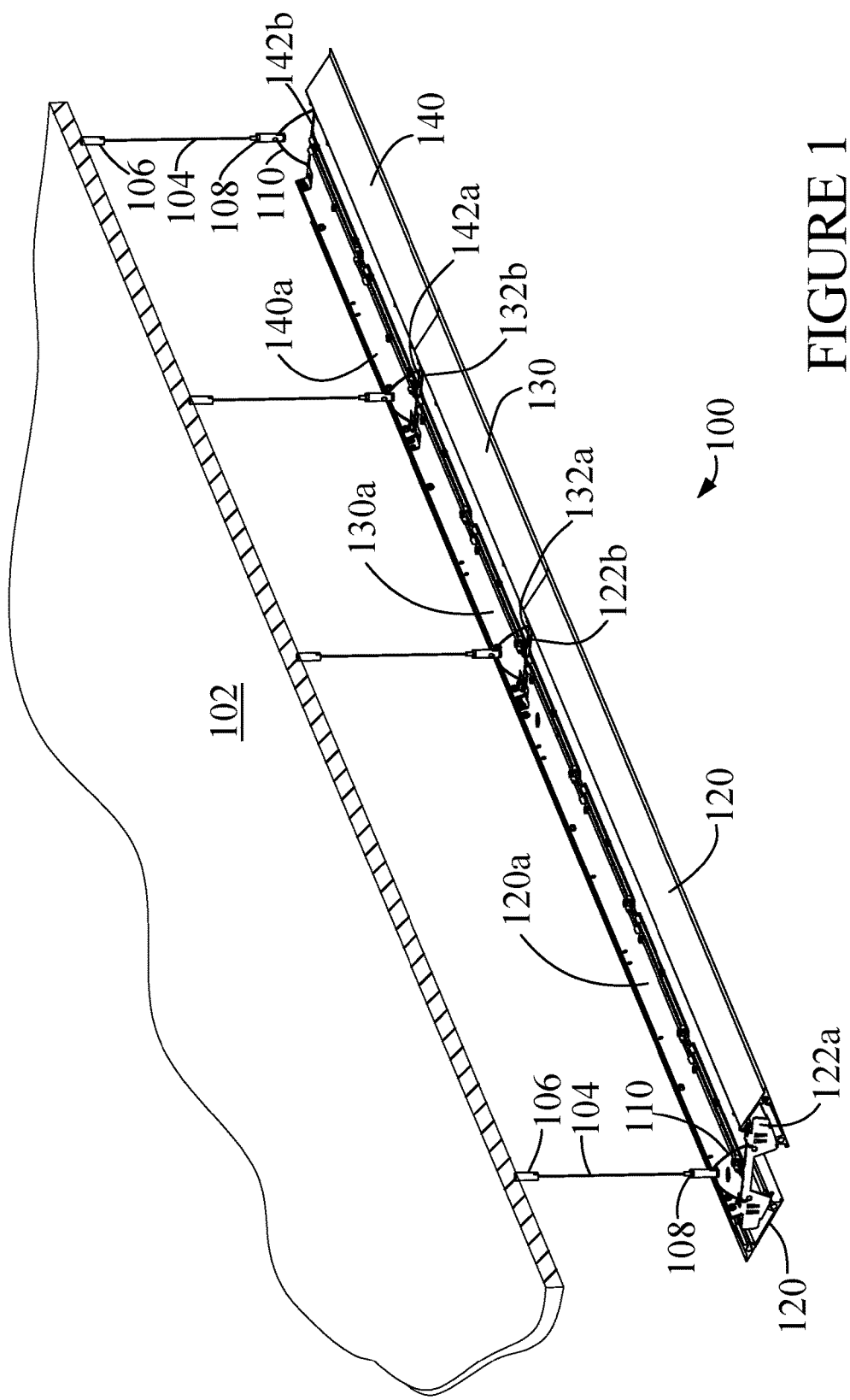
FIG. 1 is a perspective view of a lighting fixture including three housing sections held together by joiner assemblies according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure can provide an improvement in systems and apparatus for joining structures, such as lighting fixtures or other structures, that are intended to be joined or drawn together (e.g., edge-to-edge, end-to-end, etc.) to form larger structures. More particularly, at least one joiner assembly can be installed within a first structure that is adjacent to a second structure to draw together and retain at least a portion of the external surface of the first structure and at least a portion of the external surface of the second structure. Once a hooked portion of the joiner assembly is inserted through an opening in the external surface of the second structure, the joiner assembly can be actuated from the exterior of the first structure. In this way, it may not be necessary for additional components to be located within the second structure to assist or complete the actuation of the joiner assembly. As a result, the first structure and the second structure can be drawn together from the exterior of the structures without requiring access to the interior of the structure or without requiring disassembly of the structures.

Example aspects of the present disclosure will be discussed with reference to systems and apparatus for joining lighting fixtures for purposes of illustration and discussion. Those of ordinary skill in the art, using the disclosures provided herein, will understand that the systems and apparatus according to example embodiments of the present disclosure can be used to join other structures without deviating from the scope of the present disclosure. Furthermore, it should be understood by those skilled in the art, using the disclosures provided herein, that a complete and functional lighting fixture, no matter which lighting technology is incorporated (e.g., fluorescent, light emitting diode (LED, etc.) or even any other technology) may have more components than those components identified and described in this disclosure. For clarity, only those components that affect the operation and performance of or interact with the joiner assembly according to example embodiments of the present disclosure are identified in the drawings.

FIG. 1 depicts a perspective view of a suspendable, linear lighting fixture 100. Lighting fixture 100 is shown for suspended mounting from a ceiling 102 or other building support structure by supports 104. Supports can be implemented as field adjustable aircraft cables (ACCs) and associated hardware and can connect to housing sections 120, 130 and 140 through keyholes 138 (shown in FIGS. 4 and 8).

The example lighting fixture 100 shown in FIG. 1 includes three housing sections 120, 130, and 140. Each housing section 120, 130, and 140 has respective upper covers 120a, 130a and 140a, a pair of end headers 122a and 122b, 132a and 132b, and 142a and 142b, and at least one joiner assembly 150 (shown in FIGS. 2-8) located between each adjacent pair of housing sections 120, 130, and 140. The at least one joiner assembly 150 can be used to establish and maintain the mechanical connection between housing sections 120 and 130 and housing sections 130 and 140 respectively. Housing sections 120, 130 and 140 each include an internal and an external surface.

Housing sections 120, 130 and 140 perform one or more mechanical and electrical functions including: mechanically supporting lighting components such as lamp holders, lamps, light emitting diodes (LEDs), power supplies (e.g., ballasts, LED power supplies), etc.; providing location(s) to connect to supports 104; providing a connection to AC power; providing a connection to a sensor and/or a control system; or other suitable mechanical or electrical function. Features of housing sections 120, 130 and 140 can be implemented to comply with national, state, and/or local codes.

Housing sections 120, 130 and 140 can be made from extruded aluminum while end headers 122a-122b, 132a-132b, and 142a-142b can be made from 18-24 gauge steel. Upper covers 120a, 130a and 140a can be made from 24 gauge pre-paint or 0.016-inch aluminum. The specific materials and thicknesses used are application dependent. Other materials that can be used for these components include aluminum, beryllium, copper, and plastic, although the thicknesses may change.

End headers 122a-122b, 132a-132b, and 142a-142b can be retained to respective housing sections 120, 130 and 140 by a retention component 116 (shown in FIGS. 4-8). In some embodiments, the retention component 116 can be a self-tapping screw. The end headers 122a-122b, 132a-132b, and 142a-142b can perform several functions including enclosing an end of respective housing sections 120, 130 and 140, supporting joiner assembly 150, allowing connection to and internal access to adjoining housing sections 120, 130 and 140 through knockouts (not shown), and other functions.

Supports 104 can be implemented in many ways including as fixed cables, adjustable cables, pendants and chains, all of which are commonly used for suspending light fixtures. In the example embodiments of FIG. 1, supports 104 are implemented as field adjustable aircraft cables (ACCs) connecting to a cable sleeve 106 at the end to be attached to ceiling 102, and a cable gripper 108 at the opposite end. Cable gripper 108 also has a yoke 110 passing through an opening 111 (shown in FIG. 8). Yoke 110 is retained to cable gripper 108 by a thumb knurled screw 107 (shown in FIG. 4). Yoke 110 also includes a ball 109 (partially visible in FIG. 8), preferably made of lead, at each end. The shape of each ball 109 allows each one to pass through a portion of a keyhole 138 formed in end headers 122a-122b, 132a-132b, and 142a-142b (shown in FIGS. 4 and 8) while being retained by another portion of the keyhole 138. It should be understood that all of the components of support 104 can be made of materials and dimensions that safely support lighting fixture 100 and can meet all required safety codes and regulations, such as Underwriters Laboratories Inc. (UL) and the National Electrical Code (NEC).

Figure 2:
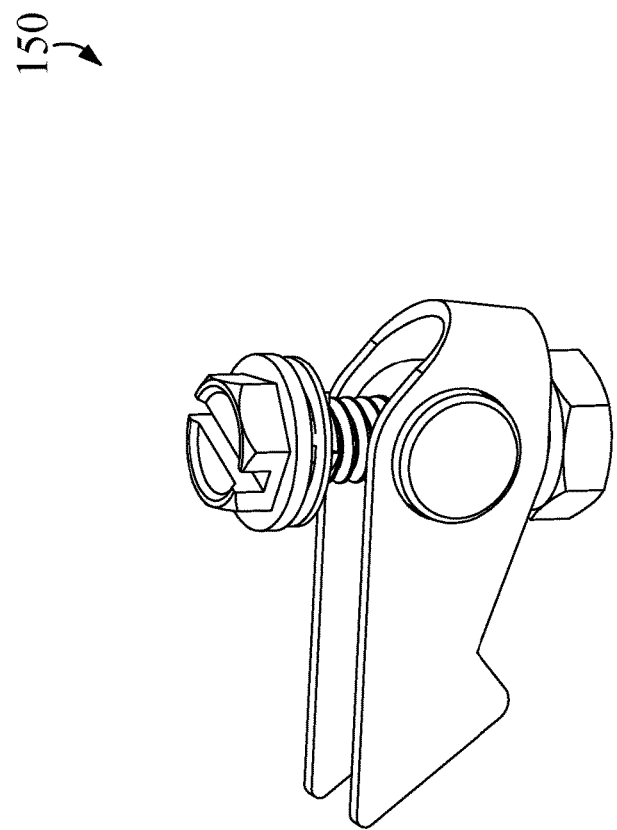
FIG. 2 is a perspective view of a joiner assembly according to example embodiments of the present disclosure.
Figure 3:
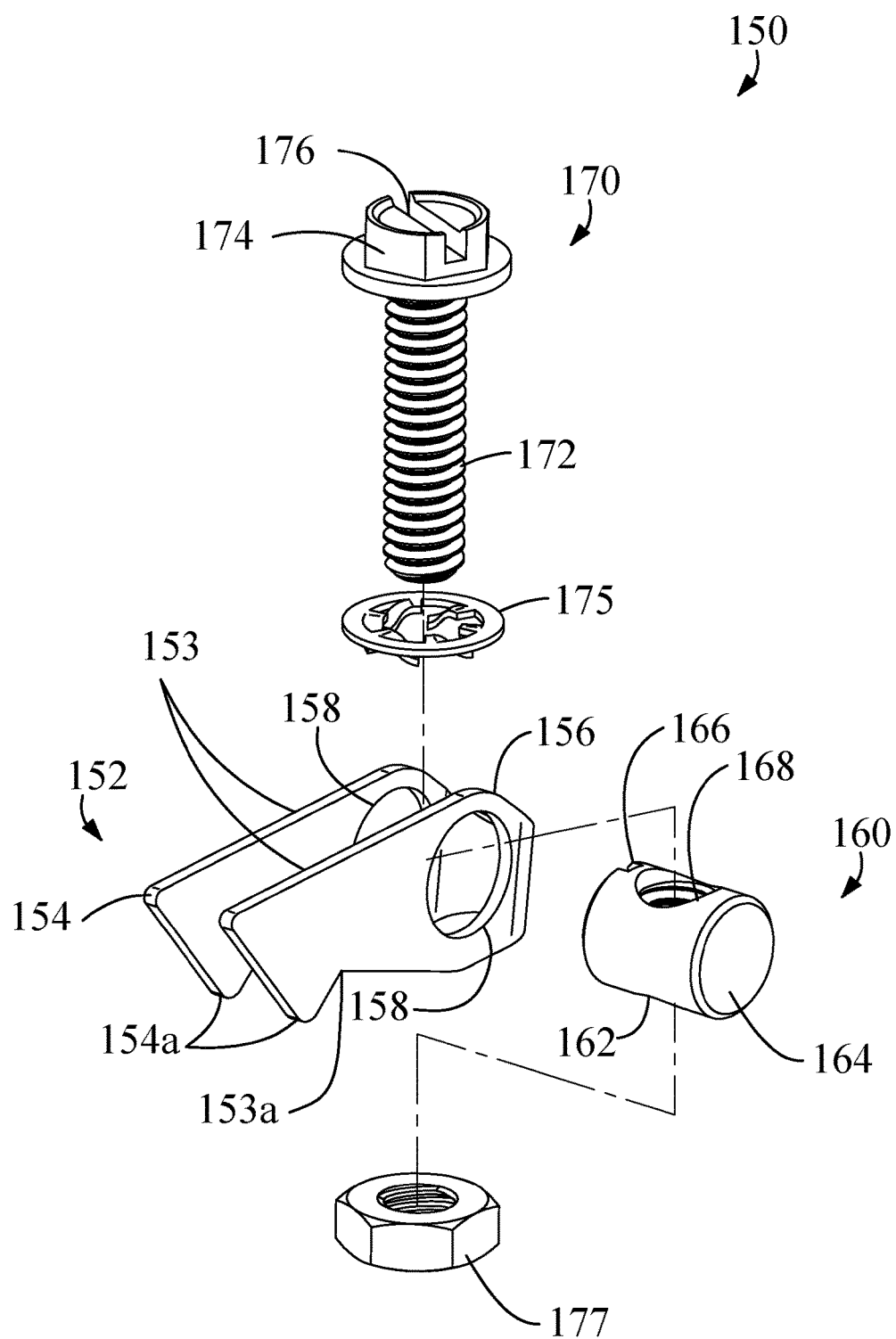
FIG. 3 is an exploded view of a joiner assembly according to example embodiments of the present disclosure.

FIGS. 2 and 3 provide perspective and exploded views, respectively, of a joiner assembly 150 according to example embodiments of the present disclosure. Joiner assembly 150 can include a hook element 152. The hook element 152 can be a U-shaped hook element having side portions 153. The joiner assembly 150 can further include a translational element 160, an actuator 170, an optional bush washer 175 and a nut 177. The hook element 152 can include hook-shaped portions 154 formed at distal ends of side portions 153. Proximal ends of side portions 153 can be connected to a radiused end portion 156. Each hook-shaped portion 154 can further include a barb 154a.

Hook element 152 can include a pair of openings 158 in side portions 153 proximate the radiused end portion 156. Each side portion 153 can include a notch 153a. While in the illustrated embodiment hook element 152 can include two hook-shaped portions 154 and an overall U-shape, it should be understood, using the disclosures provided herein, that other embodiments may have one or even more hook-shaped portions 154 and/or other shapes to meet different application requirements without departing from the scope of the present disclosure.

In the example embodiment of FIGS. 2 and 3, the translational element 160 is implemented as a barrel nut, having a generally round portion 162 that passes through openings 158. Translational element 160 has a head 164 at a first end, and head 166 configured to be engaged with a tool used to impart rotary motion (e.g., screwdriver compatible head having a lot for receiving a screwdriver) at a second end for translational element 160 to be assembled to hook element 152. The hook element 152 can move radially around the generally round portion 162 of translational element 160.

The translational element 160 can further include a threaded through opening 168 disposed in the generally round portion 162 between heads 164 and 166 and perpendicular to a major axis thereof. Translational element 160 can be adapted to receive and retain actuator 170. The threads on threaded opening 168 are designed to be compatible with a threaded portion 172 on actuator 170, which in example embodiments is implemented as a threaded screw.

Actuator 170 can include a hexagonal-shaped head 174 that includes a slot 176. The design features of head 174 allow a range of tightening/loosening options using a variety of tools and/or devices including human power to operate actuator 170. It should be understood, using the disclosures provided herein, that other head 174 configurations may be readily substituted for the hexagonal slotted head shown for purposes of illustration.

Translational element 160 effectively translates a user's rotational input to change the position of actuator 170 that, in turn moves hook element 152. In other words, translational element 160 can allow hook elements 152 to be selectively movable in response to the position of actuator 170 (e.g., to move from an engaged orientation to a disengaged orientation). It should also be understood, using the disclosures provided herein, that there may be other ways of implementing translational element 160 without departing from the scope of the present disclosure.

Joiner assembly 150 can further include a nut 177 and an optional bush washer 175, both of which are preferably made of steel. Nut 177 can have threads compatible with threads 172 on actuator 170 so that once nut 177 is properly positioned, nut 177 can be thread locked to threads 172 by appropriate means such as but not limited to the use of an adhesive or mechanical means (e.g., welding) to keep translational element 160 from unthreading too far. While bush washer 175 is not required for the operation of joiner assembly 150, its inclusion can improve the performance of joiner assembly 150 in some implementations.

Figure 4:
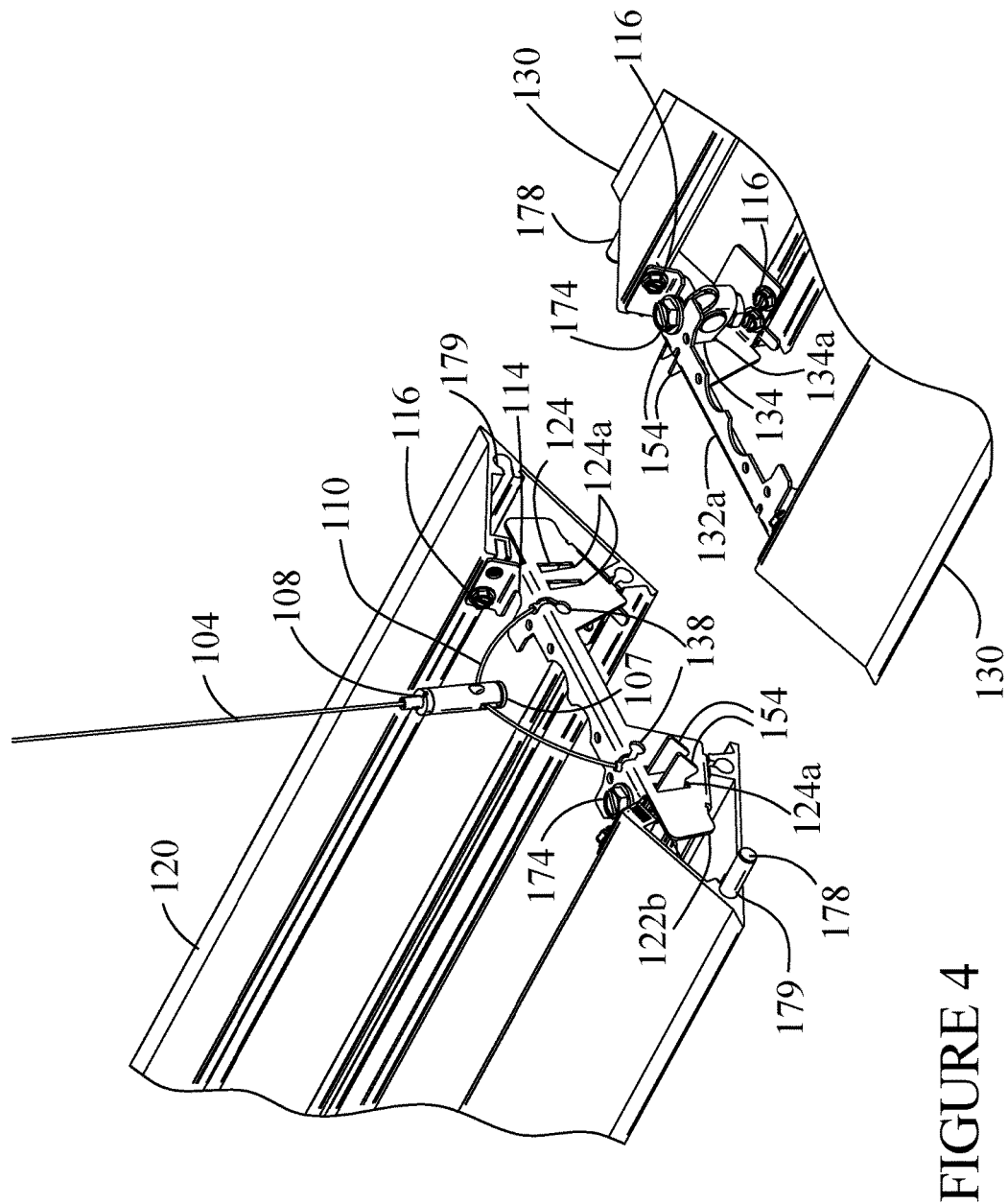
FIG. 4 is a perspective view of housing sections in a position prior to moving and aligning the housing sections according to example embodiments of the present disclosure.
Figure 5:
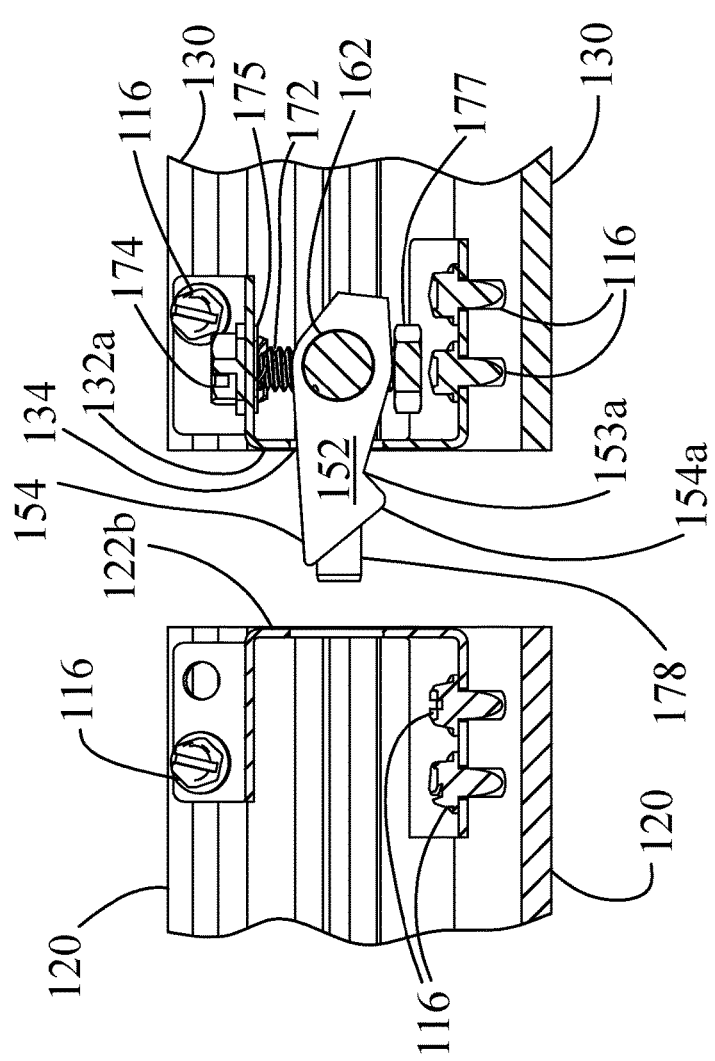
FIG. 5 is a side, cross-sectional view of housing sections in a position prior to moving and aligning the housing sections according to example embodiments of the present disclosure.

Referring now also to FIGS. 4-7, there are shown a partial perspective view (FIG. 4) and side views (FIGS. 5-7) of some of the example components shown in FIGS. 1-3. As shown in FIG. 4, head 174 of actuator 170 can extend through an opening 114 in an external surface of end headers 122a-122b, 132a-132b, and 142a-142b that is of a size to ensure that threaded portion 172 fits through opening 114 without binding, but also so that head 174 is larger than opening 114 to ensure that head 174 on actuator 170 remains accessible to allow joiner assembly 150 to be easily accessed and actuated from the exterior of lighting fixture 100.

Once joiner assembly 150 is installed in housing section 120 of lighting fixture 100, for example, hook-shaped portions 154 of hook element 152 can be positioned to extend through slot 124 in end header 122b. In addition, threaded portion 172 of actuator 170 passes through opening 114 in end header 122b. Together they allow hook element 152 and particularly hook-shaped portions 154 to rotate freely primarily in a direction perpendicular to top cover 120a (shown in FIG. 8) and to be activated by a tool (not shown) by rotating head 174 of actuator 170.

Slots 124, 134 and 144 in respective end header 122a and 122b, 132a and 132b, and 142a and 142b can have many different shapes, including a simple rectangle, to meet different application requirements without departing from the scope of the present disclosure. In the example embodiments of FIGS. 4-8, slots 124, 134 and 144 are implemented with a generally trapezoidal shape, each with a respective portion 124a, 134a and 144a being narrower, which can help to ensure that hook element 152 remains properly positioned side-to-side when hook element 152 is resting on portion 124a, 134a and 144a. The size and shape of slots 124, 134, and 144 can be selected to control the range of motion of hook element 152, and it can also allow the engagement of hook element 152 to a mating slot in a corresponding end header to be more easily and securely accomplished. While a slot 124, 134, and 144 has been chosen for purposes of disclosure, it should be understood that openings of different shapes, sizes, etc. can be used to meet different design requirements.

Figure 6:
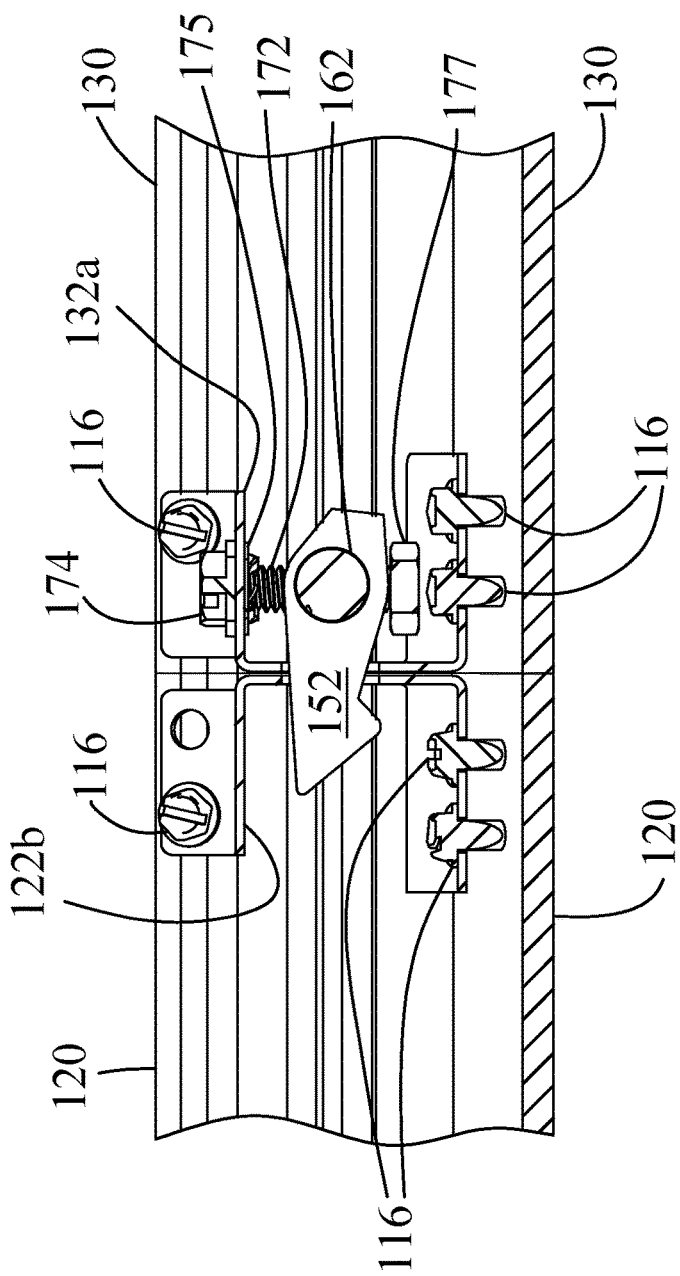
FIG. 6 is a side, cross-sectional view of housing sections in a position after moving and aligning housing sections, but prior to moving the actuator of the joiner assembly to draw the housing sections together according to example embodiments of the present disclosure.
Figure 7:
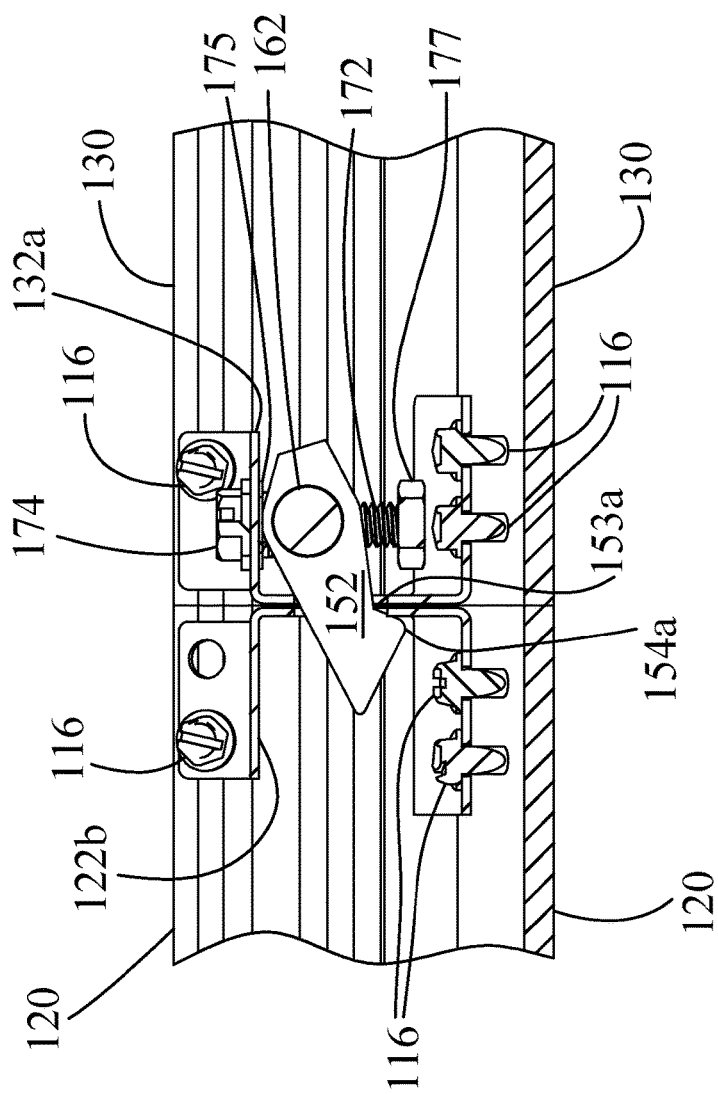
FIG. 7 is a side, cross-sectional view of housing sections after moving the actuator of the joiner assembly to draw the adjoining sections of the lighting fixture together according to example embodiments of the present disclosure.

Referring to FIGS. 6-7, once hook-shaped portions 154 of hook element 152 have progressed through slot 134 in end header 132a attached to housing section 130, and then penetrated mating slot 124 in end header 122b attached to housing section 120, the actuator 170 can be rotated by moving head 174 preferably by an appropriate tool (not shown). Rotating of the actuator 170 can cause the hook shaped elements 152 to rotate between an engaged position and a disengaged position. For instance, rotating the actuator in a first direction (e.g., clockwise) can rotate threaded portion 172. This can draw translational element 160 and hook element 152 of joiner assembly 150 upward closer to head 174 and rotating hook-shaped portions 154 of hook element 152 downward in slots 124 and 134.

Once hook shaped portion 154 has rotated far enough to contact portion 124a of slot 124, the initial contact point is located approximately near notch 153a. After the continued rotation of head 174, the final point of contact between portion 124a and hook element 152 can be located between notch 153a and barb 154a. At this time, housing sections 120 and 130 are successfully drawn and held together. In some implementations, the housing sections 120 and 130 may not separate unless joiner assembly 150 is released from the engaged position. When actuator 170 is fully tightened, bush washer 175 can contact and/or can rest against hook element 152.

Joiner assembly 150 can be disengaged by rotating head 174 of actuator 170 in an opposite direction (e.g., counterclockwise) to that used to engage joiner assembly 150. This can disengage hook-shaped portions 154 from mating slots 124, 134 and 144.

In this way, example aspects of the present disclosure can provide for actuation of joiner assembly 150 from the exterior of lighting fixture 100 without requiring disassembly or requiring a tool to penetrate an interior region of lighting fixture 100 to actuate/engage joiner assembly 150. This can make the joints between housing sections 120, 130 and 140 of lighting fixture 100 more reliable and uniform.

While the components of joiner assembly 150 are preferably made of metal such as but not limited to cold rolled steel or cast aluminum, it should be understood, using the disclosures provided herein, that other materials, and/or adding additional components such as shims, washers, pins, etc. can be used without deviating from the scope of the present disclosure.

Figure 8:
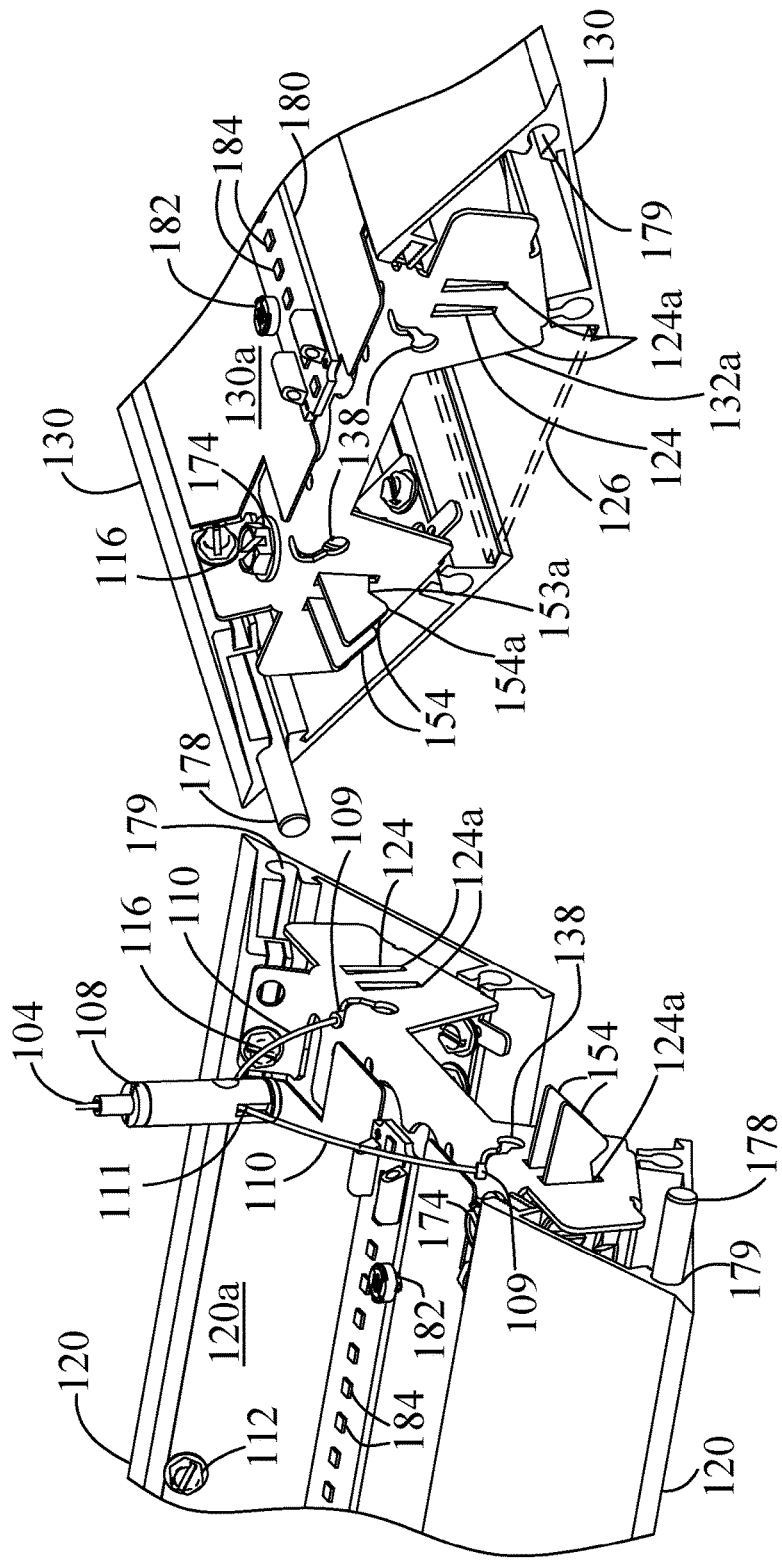
FIG. 8 is an exploded view of housing sections according to example embodiments of the present disclosure.

Referring to FIGS. 4 and 8, the operation of joiner assembly 150 can be further enhanced by the inclusion of optional alignment mechanism 178. In this example embodiment, alignment mechanism 178 can implemented as one or more alignment pins 178. It will be recognized, using the disclosures provided herein, that other alternatives such as tabs can also be used. Each of alignment mechanisms 178 can be inserted and/or fit into a receptacle 179 located in housing sections 120, 130, and 140. In this example embodiment, receptacles 179 are formed as part of the manufacture of housing sections 120, 130, and 140, although they could have been formed in a secondary operation such as drilling or milling, or even added as an additional component. Alignment mechanism 178 can be included to constrain adjacent housing sections from moving in at least one major axis of the lighting fixture 100 and/or to reduce torsional movement. This can lead to improving the ease of alignment of joiner assembly 150.

The embodiments shown in described in FIGS. 4-8 include multiple joining assemblies 150 used to join housing sections 130 and 120. The use of multiple joining assemblies 150 can provide redundancy and can also provide better balance of mechanical forces. Those of ordinary skill in the art, using the disclosures provided herein, can understand that only a single joiner assembly 150 can be used to join housing sections 120 and 130 without deviating from the scope of the present disclosure.

Referring to FIG. 8, there is shown an exploded view of a portion of lighting fixture 100 to better show some components, especially upper covers 120a and 130a of respective housing sections 120 and 130, optional LED strips 180 and an optional light diffuser 126. Upper covers 120a, 130a and 140a provide several functions including enclosing the top of housing sections 120, 130 and 140, to support LED strips 180, and to potentially support actuators 170. Upper covers 120a, 130a and 140a are retained to respective housing sections 120, 130 and 140 by retention components 112, which in this embodiment are self-tapping screws. Optional light diffuser 126 can be included with any or all housing sections 120, 130 and 140 to further enhance the performance of lighting fixture 100.

LED strips 180 can be mechanically positioned and connected to upper covers 120a and 130a by fasteners 182. LED strips 180 can include one or more LEDs 184 to provide lighting from lighting fixture 100. LED strips 180 can be powered and controlled either in conjunction with or independent of the other lighting sources and power supplies within lighting fixture 100. It should also be understood that although lighting fixture 100 may include light source(s) that include LEDs, the light fixture 100 can alternative or additionally include other light sources, such as fluorescent lamps with appropriate ballasts, powered strips of electroluminescent material, or any other suitable light source.

Figure 9:
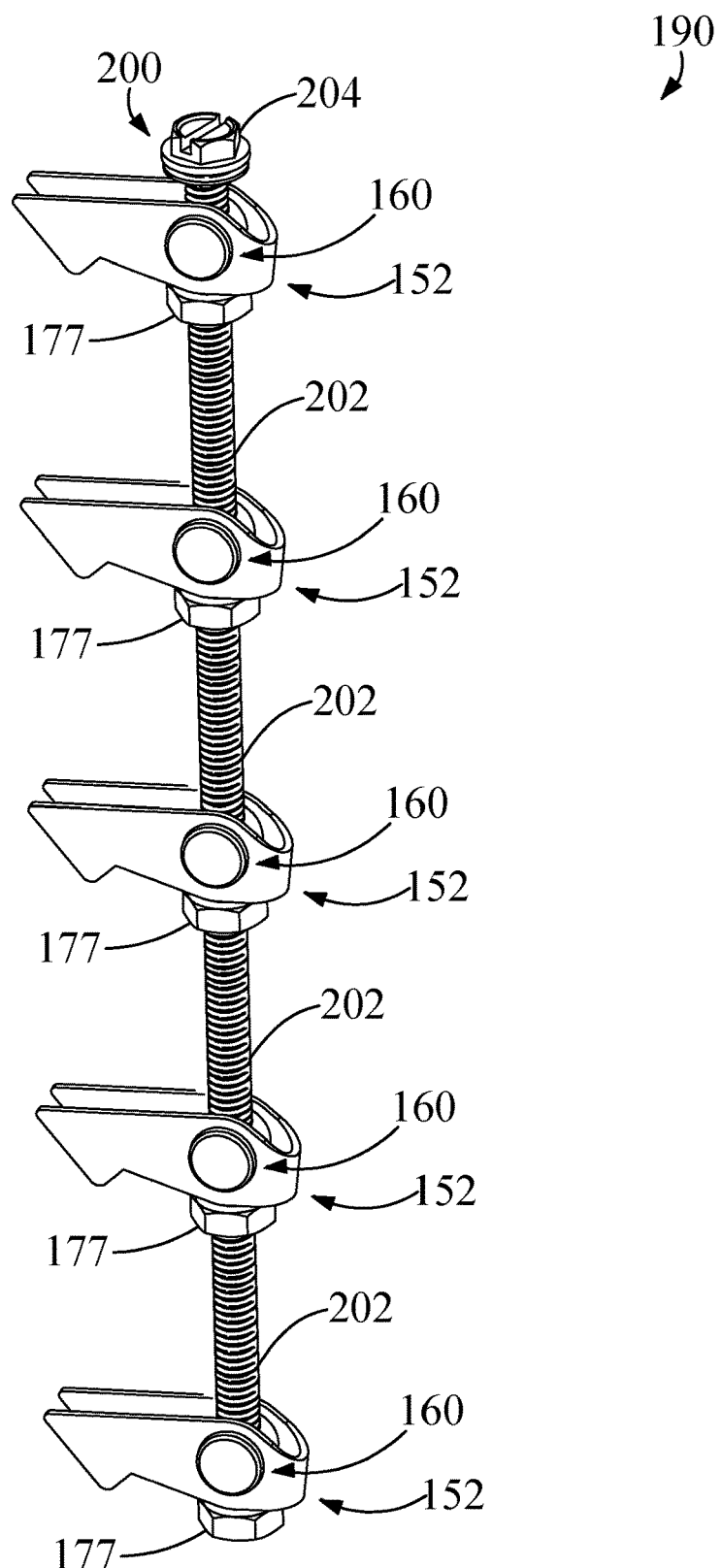
FIG. 9 is a perspective view of a joiner assembly according to example embodiments of the present disclosure.

FIG. 9 depicts a side view of a joiner assembly 190 according to example aspects of the present disclosure. Joiner assembly 190 is very similar to joiner assembly 150 shown in FIGS. 2-8 and has many of the same components. The joiner assembly 190 further includes a plurality of U-shaped hook elements 152 and translational elements 160 controlled by the movement of a single actuator 200 similar to actuator 170. Joiner assembly 190 is intended for applications such as but not limited to drawing together room dividers that due to their height, would benefit by having a plurality of U-shaped hook elements 152. Threaded portion 202 can also be implemented in other ways, depending on the application, including as a flexible shaft with at least of portions corresponding to the locations of hook elements 152 being threaded, and/or also including a device such as a ball joint to allow actuation in a different axis.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A joiner assembly for joining a first structure and a second structure, the joiner assembly comprising:
   a hook element having an opening defined in at least one side portion of the hook element;
   a translational element passing through the opening of the hook element, the translation element defining an opening; and
   an actuator received into the opening defined by the translational element, the actuator operably connected to the translational element such that rotational movement of the actuator causes the translational element to rotate the hook element from a first position to a second position.

2. The joiner assembly of claim 1, wherein the hook element is a U-shaped hook element having a pair of side portions.

3. The joiner assembly of claim 2, wherein the hook element comprises an opening defined in each side portion.

4. The joiner assembly of claim 3, wherein the translation element passes through each opening defined in each side portion.

5. The joiner assembly of claim 3, wherein the translational element comprises a generally round portion that passes through each opening defined in each side portion.

6. The joiner assembly of claim 2, wherein the hook element comprises a hook-shaped portion formed at a distal end of each side portion.

7. The joiner assembly of claim 2, wherein the hook element comprises a notch and barb formed in each side portion.

8. The joiner assembly of claim 1, wherein the translational element comprises at least one head configured to be engaged with a tool used to impart rotary motion.

9. The joiner assembly of claim 1, wherein the actuator comprises a head configured to be engaged with a tool used to impart rotary motion and a threaded portion received into the opening of the translational element.

10. The joiner assembly of claim 1, wherein the opening defined by translation element comprises a threaded through opening.

11. The joiner assembly of claim 10, wherein threads on the threaded through opening are compatible with a threaded portion of the actuator.

12. A lighting system, comprising:
a first housing section;
a second housing section;
a joiner assembly comprising:
   a hook element inserted into an opening defined by the first housing section, the hook element having an opening defined in at least one side portion of the hook element;
   a translational element passing through the opening of the hook element, the translational element defining an opening; and
   an actuator received into an opening defined in the second housing section such that at least a portion of the actuator remains accessible from an exterior of the first housing section and the second housing section, the actuator further received into the opening defined by the translational element such that the actuator is operably connected to the translational element.

13. The lighting system of claim 12, wherein the actuator is operably connected to the translational element such that rotation of the actuator causes the hook element to rotate from a first position to a second position, wherein when the hook element is in the second position, the first housing section is joined with the second housing section.

14. The lighting system of claim 12, wherein the hook element is a U-shaped hook element having a pair of side portions.

15. The lighting system of claim 14, wherein the hook element comprises an opening defined in each side portion.

16. The lighting system of claim 15, wherein the translation element passes through each opening defined in each side portion.

17. The lighting system of claim 15, wherein the hook element comprises a hook-shaped portion formed at a distal end of each side portion.

18. The lighting system of claim 15, wherein the hook element comprises a notch and barb formed in each side portion.

19. A lighting system, comprising:
a first housing section;
a second housing section; and
means for joining the first housing section of the lighting system and the second housing section of the lighting system.

20. The lighting system of claim 19, wherein the means includes a joiner assembly, the joiner assembly comprising:
   a hook element having an opening defined in at least one side portion of the hook element;
   a translational element passing through the opening of the hook element, the translational element defining an opening; and
   an actuator received into the opening defined by the translational element, the actuator operably connected to the translational element such that rotational movement of the actuator causes the translational element to rotate the hook element from a first position to a second position.

* * * * *